(12) United States Patent
Laule et al.

(10) Patent No.: US 7,975,870 B2
(45) Date of Patent: Jul. 12, 2011

(54) RING SEAL HAVING SEALING LOBES

(75) Inventors: William J. Laule, Grosse Pointe Farms, MI (US); James R. Osborne, Davisburg, MI (US); Michael R. Rivenburgh, Clarkston, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 585 days.

(21) Appl. No.: 11/847,063

(22) Filed: Aug. 29, 2007

(65) Prior Publication Data

US 2009/0058015 A1  Mar. 5, 2009

(51) Int. Cl.
*F17C 13/06* (2006.01)

(52) U.S. Cl. ...................................................... 220/582

(58) Field of Classification Search ................... 220/582, 220/795, 804, 801, 806, 796, FOR. 111, FOR. 105, 220/FOR. 202, DIG. 33; 277/609, 630, 648, 277/649, 607, 615; 215/341, 316
See application file for complete search history.

(56) References Cited

U.S. PATENT DOCUMENTS

| | | | | |
|---|---|---|---|---|
| 2,738,095 | A | * | 3/1956 | Carter ............................ 220/293 |
| 3,064,853 | A | * | 11/1962 | Lents et al. ................... 220/804 |
| 3,467,448 | A | | 9/1969 | Galle |
| 3,788,654 | A | | 1/1974 | Mandley |
| 3,918,726 | A | | 11/1975 | Kramer |
| 4,016,096 | A | * | 4/1977 | Meyer ............................. 588/16 |
| 4,067,531 | A | * | 1/1978 | Sikula ........................... 220/378 |
| 4,248,439 | A | | 2/1981 | Haslett |
| 4,262,914 | A | | 4/1981 | Roley |
| 4,344,629 | A | | 8/1982 | Oelke |
| 4,364,572 | A | | 12/1982 | Yamamoto et al. |
| 4,426,091 | A | | 1/1984 | Baylor |
| 4,568,090 | A | | 2/1986 | Westemeier |
| 4,744,570 | A | * | 5/1988 | Kranz ............................ 277/647 |
| 4,813,690 | A | | 3/1989 | Coburn, Jr. |
| 4,848,730 | A | * | 7/1989 | Logman et al. ................ 251/367 |
| 5,062,455 | A | * | 11/1991 | Schurter et al. ................. 138/30 |
| 5,234,039 | A | | 8/1993 | Aoshima et al. |
| 5,265,890 | A | | 11/1993 | Balsells |
| 5,330,068 | A | | 7/1994 | Duhaime et al. |
| 5,380,017 | A | * | 1/1995 | Leeuwenburg et al. ...... 277/615 |
| 5,860,680 | A | | 1/1999 | Drijver et al. |
| 5,879,010 | A | | 3/1999 | Nilkanth et al. |
| 5,913,441 | A | | 6/1999 | Voirol |
| 5,921,432 | A | * | 7/1999 | Van Berne et al. ........... 220/792 |
| 5,944,323 | A | | 8/1999 | Cavka |
| 6,012,904 | A | | 1/2000 | Tuckey |
| 6,091,175 | A | | 7/2000 | Kinsinger |
| 6,305,483 | B1 | * | 10/2001 | Portwood |
| 6,332,555 | B1 | * | 12/2001 | Stangier |

(Continued)

FOREIGN PATENT DOCUMENTS

GB  2276152 A  *  9/1994

(Continued)

*Primary Examiner* — Anthony Stashick
*Assistant Examiner* — Robert J Hicks
(74) *Attorney, Agent, or Firm* — Reising Ethington P.C.

(57) ABSTRACT

A ring seal includes a body portion and a tail portion extending from the body portion. The body portion has, when viewed in cross-section and in an uncompressed state, an axially outboard surface and an axially inboard surface. The outboard surface defines a first sealing lobe, and the inboard surface defines a second sealing lobe that shares an axial centerline with the first sealing lobe.

19 Claims, 2 Drawing Sheets

U.S. PATENT DOCUMENTS

| | | |
|---|---|---|
| 6,357,618 B1 * | 3/2002 | Kloess et al. |
| 6,357,759 B1 * | 3/2002 | Azuma et al. |
| 6,357,760 B1 * | 3/2002 | Doyle |
| 6,419,236 B1 * | 7/2002 | Janian |
| 6,450,502 B1 * | 9/2002 | Baehl et al. |
| 6,497,415 B2 * | 12/2002 | Castleman et al. |
| 6,502,826 B1 * | 1/2003 | Schroeder et al. |
| 6,533,288 B1 * | 3/2003 | Brandner et al. |
| 6,691,888 B2 * | 2/2004 | Moser et al. |
| 6,698,613 B2 * | 3/2004 | Goto et al. |
| 6,755,422 B2 * | 6/2004 | Potter |
| 6,854,739 B2 * | 2/2005 | Schleth et al. |
| 7,134,671 B2 * | 11/2006 | Duke et al. |
| 7,140,617 B2 * | 11/2006 | Popielas et al. |
| 2002/0017527 A1 | 2/2002 | Goto et al. |
| 2002/0053769 A1 | 5/2002 | Oiarbide Aseguinolaza |
| 2002/0158419 A1 | 10/2002 | Zitting et al. |
| 2002/0195455 A1 * | 12/2002 | Takahashi et al. .......... 220/806 |
| 2004/0119244 A1 * | 6/2004 | Duke et al. .................... 277/549 |
| 2004/0188953 A1 * | 9/2004 | Fonville et al. ............... 277/603 |
| 2004/0239047 A1 | 12/2004 | Kent et al. |
| 2006/0081635 A1 * | 4/2006 | Matsutori et al. ............ 220/378 |
| 2006/0175765 A1 * | 8/2006 | Happel ......................... 277/609 |
| 2007/0289984 A1 * | 12/2007 | Kloss et al. ................... 220/795 |
| 2008/0252020 A1 * | 10/2008 | Heiman et al. ................ 277/593 |

FOREIGN PATENT DOCUMENTS

| | | |
|---|---|---|
| JP | 2004278622 | 10/2004 |
| JP | 2005016651 | 1/2005 |

* cited by examiner

RING SEAL HAVING SEALING LOBES

FIELD OF THE INVENTION

This invention relates generally to seals, and more particularly to ring seals of particular cross-sectional shape and construction.

BACKGROUND OF THE INVENTION

Automotive fuel system seals include polymeric, deformable components that are widely used in many different applications to make a pressure-tight joint between parts, and typically include ring-shaped axial seals and radial seals or O-rings. In use, radial seals are compressed in a radial direction perpendicular to a seal centerline on radially inside and outside surfaces of the radial seal's cross-section, whereas axial seals are compressed in an axial direction parallel to a seal centerline on axially opposed surfaces of the axial seal's cross-section.

Axial seals are widely used to seal openings of containers. For example, axial seals are often used to seal an opening in a fuel tank and can be disposed in a flange-type joint between a mounting flange of a fuel delivery module and an outer surface of a fuel tank.

SUMMARY OF THE INVENTION

One embodiment of a ring seal may include a body portion and a tail portion. The body portion has, when viewed in cross-section and in an uncompressed state, an axially outboard surface and an axially inboard surface. The outboard surface defines a first sealing lobe, and the inboard surface defines a second sealing lobe that shares an axial centerline with the first sealing lobe.

One embodiment of a sealed joint may include a first component, a second component, and a ring seal. The second component is mounted to the first component, and the ring seal is disposed between the first and second components. The ring seal may include a body portion and a tail portion. The body portion has, when viewed in cross-section and in an uncompressed state, an axially outboard surface and an axially inboard surface. The outboard surface defines a first sealing lobe, and the inboard surface defines a second sealing lobe that shares an axial centerline with the first sealing lobe.

One embodiment of an assembly may include a fuel tank, a plug, and a ring seal. The fuel tank defines an opening. The plug is mounted to the fuel tank and in the opening. The plug may have a radial flange and an axial flange. The ring seal is disposed between the fuel tank and the plug, and forms a sealed joint therebetween. The ring seal may have, when viewed in cross-section and in an uncompressed state, a body portion and a tail portion. The body portion has an axially outboard surface and an axially inboard surface. The outboard surface defines a first sealing lobe that, when the ring seal is disposed between the fuel tank and the plug, bears against the radial flange. The inboard surface defines a second sealing lobe that, when the ring seal is disposed between the fuel tank and the plug, bears against the fuel tank. The first and second sealing lobes share an axial centerline. The tail portion extends from the body portion and may have, when viewed in cross-section and in an uncompressed state, a radially inward surface that defines a planar wall. The planar wall bears against the axial flange when the ring seal is disposed between the fuel tank and the plug.

At least some of the objects, features, and advantages that may be achieved by at least some example embodiments of the invention include providing a seal that is readily adaptable to various sealing applications including axial seals in sealed joints between fuel tanks and fuel modules; resists rolling during assembly and vacuum conditions; and is of relatively simple design and economical manufacture and assembly, durable, reliable and in service has a long useful life.

Of course, other objects, features and advantages will be apparent in view of this disclosure to those skilled in the art. Various other seals and sealing applications embodying the invention may achieve more or less than the noted objects, features or advantages.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
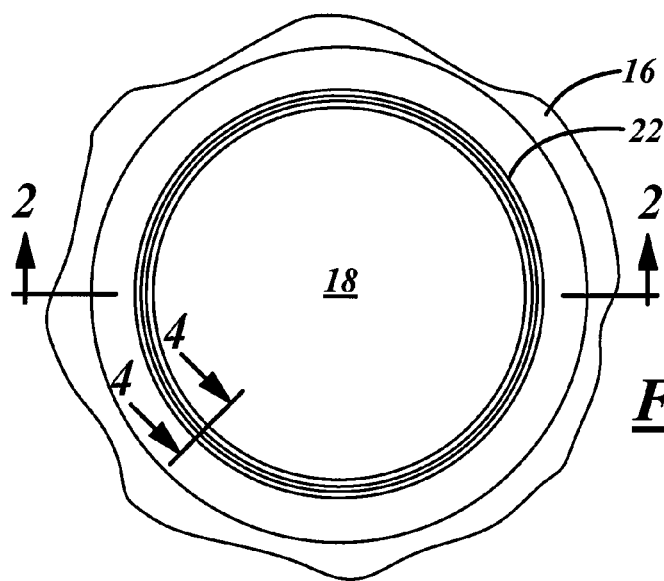
FIG. 1 is a fragmented top view of a fuel tank having a plug mounted thereto.

In general, and before referring to the drawing figures, various example embodiments of a ring seal are shown and described. The various example embodiments may be used in any desired application, but are all particularly well-adapted for a flange joint used with a fuel tank of an automobile, or a fuel tank of any number of recreational, marine, industrial, garden, and/or agricultural products. Furthermore, the ring seals shown have a circular and cylindrical shape, and thus naturally define an imaginary axis, an imaginary radius, and an imaginary circumference. In this regard, the term "axially" describes a direction generally parallel to the axis, "radially" describes a direction generally parallel to or along the radius, and "circumferentially" describes a direction generally along the circumference.

Referring in more detail to the drawings, FIGS. 2-7 show several example embodiments of a ring seal 10 that can be used with and compressed between a first component and a second component to form a pressure-tight and fluid-tight sealed joint thereat. The ring seal 10 is designed to have a body portion 12 and a tail portion 14 that together provide a substantially uniform load to the ring seal when it's compressed, and also help maintain the position of the ring seal at the sealed joint. In particular, the ring seal 10 exhibits increased resistance to pressure burst or blow-out when the ring seal is subjected to a pressurized condition, and also exhibits increased resistance to twisting or rolling when the ring seal is being assembled or when it's subjected to a vacuum condition.

Figure 2:
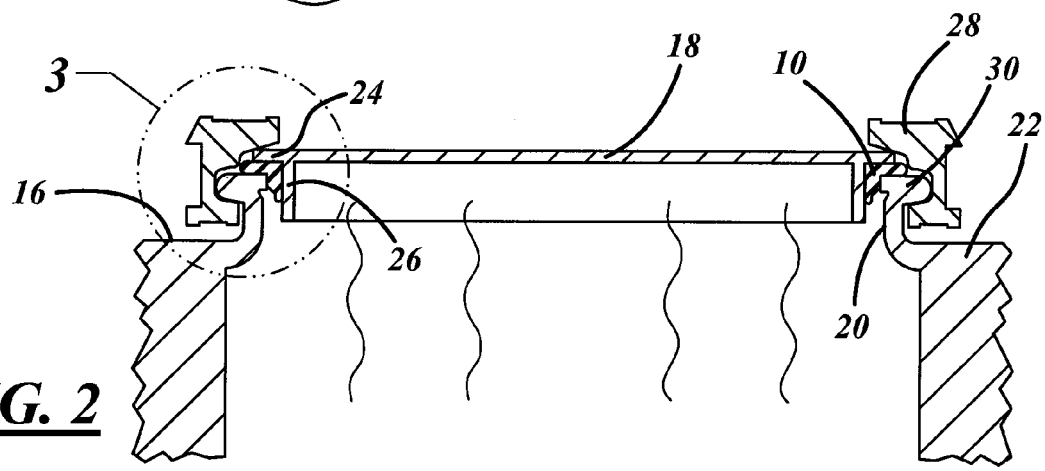
FIG. 2 is a cross-sectional view of the fuel tank of FIG. 1 taken along line 2-2 thereof, showing a first example embodiment of a ring seal disposed between the fuel tank and the plug.

Referring to FIGS. 1 and 2, the ring seal 10 may be used with fuel system components such as a fuel tank 16 that stores a fuel and a plug or cover 18 mounted to the fuel tank 16 at an opening 20 (FIG. 2) defined in a fuel tank wall 22. The fuel itself may be composed of highly volatile hydrocarbons that may quickly vaporize such as in gasoline, gasohol, alcohol, or diesel fuel. The plug 18 may help prevent the vaporized fuel from escaping the fuel tank 16, and may include a radial flange 24 extending beyond the opening 20 and an axial flange 26 extending axially into the opening. The plug 18 may be any component, such as a mounting flange of a fuel delivery module or a fuel filler pipe (not shown). The plug 18 may be mounted or positioned adjacent or against the fuel tank wall 22 wherein the plug may be attached to the fuel tank 16 in any suitable manner, such as by a locking or clamping ring device 28 in cooperation with a lip or rim 30, or such as described in U.S. patent application Ser. No. 11/361,399, which is assigned to the assignee hereof and is incorporated by reference herein in its entirety.

The ring seal 10 may be substantially annular or ring-shaped, and circumferentially continuous; and in an uncompressed or relaxed state, the ring seal may have a minimum inside diameter slightly less than the outside diameter of the axial flange 26 of the plug 18 so that, when assembled thereto, the ring seal stretches and frictionally engages the axial flange to form an interference fit. This may save the ring seal 10 from twisting or rolling when the plug 18 with the ring seal thereon is installed in the opening 20, or when the ring seal is subjected to a vacuum condition in the fuel tank 16.

The ring seal 10 may be manufactured by an injection molding process, and may be composed of a relatively flexible and preferably resilient material such as a thermoplastic, a thermoset, an elastomer, or a composite thereof. In one example, the ring seal 10 may be composed of a relatively high-performance vapor-permeation-resistant polymer such as Viton® (available from DuPont Dow Elastomers of Wilmington, Del.), or the like, with a relatively high FKM fluorocarbon content. In another example, the ring seal 10 may be at least partially composed of a bisphenol cured fluorocarbon rubber such as VW252-65 available from Parker Engineered Seals Division, a subsidiary of Parker Hannifin Corporation. In yet another example, the ring seal 10 may be composed of any liquid-fuel-resistant elastomer, for example, a nitrile elastomer, fluoro-silicone rubber, butylene-nitrol elastomer, or a lower FKM content elastomer. The material may contain ⅔ or more FKM with an approximate coefficient of friction of 0.25. For use in fuel systems as described, the polymeric materials may exhibit suitable resistance to degradation and swelling when in contact with hydrocarbon fuels such as gasoline, gasohol, alcohol, diesel, and the like.

Figure 3:
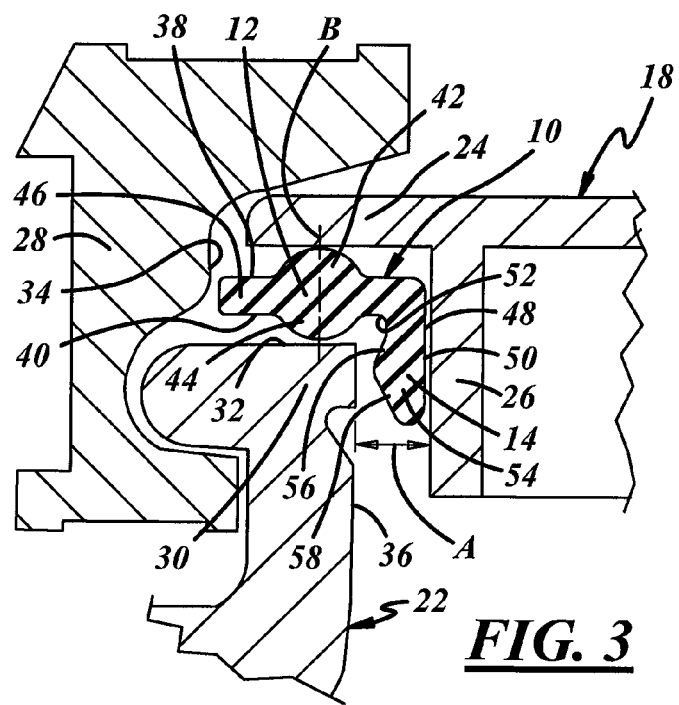
FIG. 3 is an enlarged, fragmentary view of circle 3 of the ring seal of FIG. 2, showing the ring seal in an uncompressed state.

Referring to FIG. 3, the ring seal 10 may be disposed between the plug 18 and the lip 30. In the axial direction, the ring seal 10 may be particularly located between the radial flange 24 and an upper surface 32 of the lip 30 at an axial inboard end. In assembly, the ring seal 10, specifically the body portion 12, is compressed in the axial direction when installed so that it squarely engages the radial flange 24 and the lip 30, and in this sense may be characterized as an "axial seal." In the radial direction, the ring seal 10 may be particularly located between the axial flange 26 at a radial inward end and an inner surface 34 of the locking device 28 at a radial outward end. In this sense the ring seal 10 may be characterized as a "face seal" or a "flange seal." When the ring seal 10 is installed, the tail portion 14 is generally disposed in a circumferentially continuous radial gap A defined between the axial flange 26 and an inner surface 36 of the lip 30. The tail portion 14 is designed and can be sized to fit in a radial gap exceeding 3 mm in width. Accordingly, the tail portion 14 improves sealing performance under both pressure and vacuum conditions in the fuel tank 16 and may save the ring seal 10 from pressure burst or blow-out and twisting or rolling into the radial gap A.

The body portion 12 may constitute the section of the ring seal 10 which undergoes axial compression between the radial flange 24 and the upper surface 32 of the lip 30. Adjacent the radial flange 24, the body portion 12 is bound by an axially outboard surface 38; and adjacent the upper surface 32, the body portion is bound by an axially inboard surface 40. As shown in FIG. 3, the axially outboard surface 38 defines a first sealing lobe 42, and the axially inboard surface 40 defines a second sealing lobe 44. The sealing lobes in cross-section may be roundish projections extending axially beyond an otherwise flat surface, and extend continuously around the circumference of the ring seal 10. With respect to each other, the first and second sealing lobes 42, 44 may be located at the same radial position relative to the body portion 12. Put differently, the first and second sealing lobes 42, 44 share a common imaginary axial centerline B such that the sealing lobes are generally symmetrical about the axial centerline. At the axial centerline B, the first and second sealing lobes 42, 44 may peak in equal axial length or height. When compressed, the first sealing lobe 42 bears against the radial flange 24 to form a first circumferentially continuous seal at the contiguous interface therebetween. The second sealing lobe 44, on the other hand, bears against the upper surface 32 to form a second circumferentially continuous seal at the contiguous interface therebetween. By virtue of their relation to each other, the first and second sealing lobes 42, 44 help distribute a uniform compressing load to the body portion 12. This improves sealing performance and may save the ring seal 10 from pressure burst or blow-out and twisting or rolling into the radial gap A.

The body portion 12 may also include a radially outward projection 46 that helps maintain the radial position of the ring seal 10 with respect to the axial flange 26 and the inner surface 34 of the locking device 28. The radially outward projection 46 constitutes the most outwardly projecting radial portion of the ring seal 10. And when the ring seal 10 is subjected to an increased superatmospheric pressure condition from the fuel tank 16, the radially outward projection 46 may abut the inner surface 34 and thus prevent the ring seal 10 from being further displaced or otherwise pressure burst or blown-out.

Still referring to FIG. 3, the tail portion 14 may extend from the body portion 12 and may constitute the section of the ring seal 10 which substantially fits radially within the radial gap A. The tail portion 14 may extend continuously around the circumference of the ring seal 10. At a radially innermost end, the tail portion 14 is bound by a radially inward surface 48 which may be substantially cylindrical and in cross-section may define a planar wall 50. The planar wall 50 may extend continuously around the inner circumference of the ring seal 10. When the ring seal 10 is compressed, the planar wall 50 may bear substantially flush against the complementary cross-sectional planar axial flange 26 to form, in some instances, a third circumferentially continuous seal at the contiguous interface therebetween. The flush interface may also help maintain the position of the ring seal 10 with respect to the plug 18 and the lip 30 by limiting or preventing rolling or an otherwise teetering movement of the ring seal.

First Example Embodiment of the Ring Seal

Figure 4:
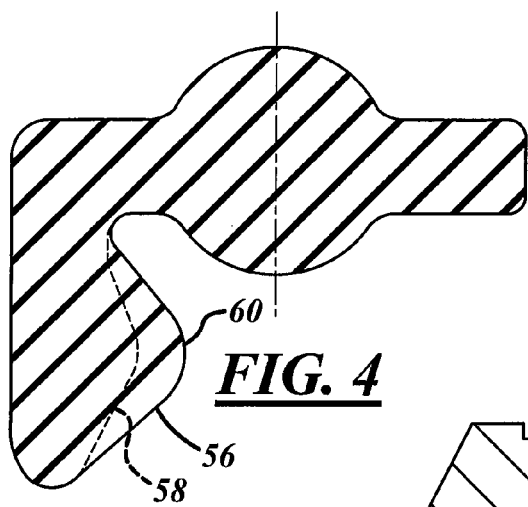
FIG. 4 is a cross-sectional view of the ring seal of FIG. 1 taken along line 4-4 thereof, showing the ring seal in an uncompressed state and having a pilot protrusion.

FIGS. 3 and 4 show a first example embodiment of the ring seal 10. In addition to the subject matter described above, the ring seal 10 in this example embodiment may further include a circumferentially continuous recess or groove 52 defined between the body portion 12 and the tail portion 14. The recess 52 may, among other things, provide room for displacement of part of the body portion 12 and the tail portion 14 when the ring seal 10 is compressed. This may instill more compressive flexibility to the ring seal 10 as compared to a ring seal without such a recess.

In this example embodiment, the ring seal 10 may generally have an L-shaped cross-section with a skirt 54 formed at a free end of the tail portion 14. The skirt 54 may extend continuously around the circumference of the ring seal 10, and may also extend axially away from the body portion 12 in a generally perpendicular direction. When the ring seal 10 is compressed, the skirt 54 may be located between the axial flange 26 and the inner surface 36 of the lip 30. In some instances, the skirt 54 may help maintain the position of the ring seal 10 with respect to the plug 18 and the lip 30 by limiting or preventing rolling or an otherwise teetering movement of the ring seal. The skirt 54 may be bound on one side by a radially outward surface 56 that defines a pilot wall 58. The pilot wall 58 may be frustoconical or otherwise inclined with respect to the planar wall 50 and may extend from the free end of the tail portion 14 to a radially outermost peak thereof. When installing an already assembled plug 18 and ring seal 10 in the opening 20, the pilot wall 58 may help guide and center the position of the plug and ring seal in the opening by riding on the lip 30 and thus leading the plug and ring seal into the opening and generally concentric therewith. Furthermore, when the ring seal 10 is compressed, the radially outermost peak of the tail portion 14 may bear against the inner surface 36 of the lip 30 to form, in some instances, a fourth circumferentially continuous seal at the contiguous interface therebetween.

Referring to FIG. 4, the radially outward surface 56 may also define a plurality of pilot protrusions 60 that, like the pilot wall 58, help guide and center the position of an already subassembled plug 18 and ring seal 10 when installing the assembly in the opening 20. Here, the lip 30 may ride against the pilot protrusions 60 and thus be led into the opening 20. The pilot protrusions 60 may be a nub delineated circumferentially by a first end and a second end (not shown), and may project in the radially outward direction beyond the pilot wall 58. There can be any number of them circumferentially spaced apart around the circumference of the tail portion 14. For example, twelve pilot protrusions 60 may be equally spaced apart around the tail portion's circumference.

Second Example Embodiment of the Ring Seal

Figure 5:
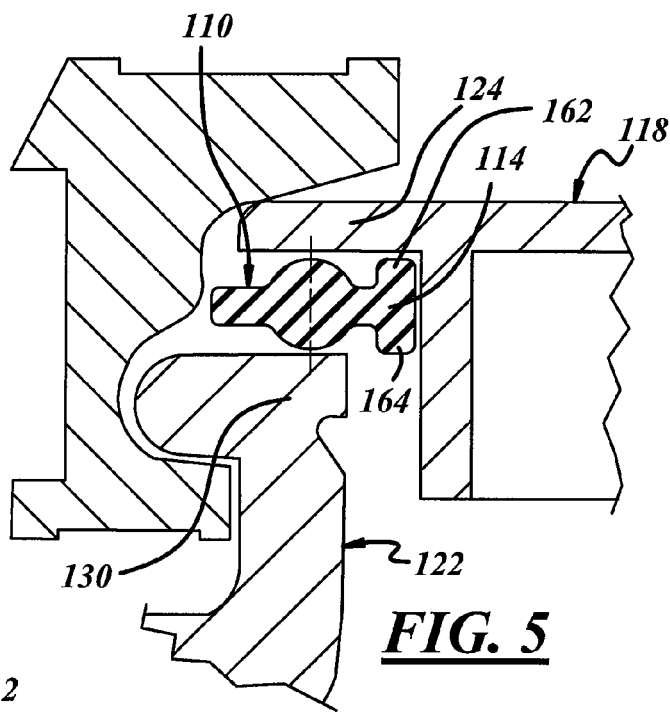
FIG. 5 is an enlarged, fragmentary view of a second example embodiment of a ring seal in an uncompressed state disposed between a fuel tank and a plug.

FIG. 5 shows a second example embodiment of a ring seal 110. This example embodiment is similar to the first example embodiment in some respects which may be gathered from the figure, and previous descriptions of which are incorporated by reference; additionally, like numerals between the example embodiments generally designate like or corresponding elements throughout the figures.

One difference in this example embodiment is a tail portion 114. In cross-section, the tail portion 114 may have oppositely disposed free ends or sides, each defining an axial protrusion that help maintain the position of the ring seal 110 with respect to a plug 118 and a lip 130 of a fuel tank wall 122. An axially outboard protrusion 162 extends from the tail portion 114 in the axially outboard direction, and an axially inboard protrusion 164 extends equally in distance and opposite in direction from the axially outboard protrusion. The protrusions 162, 164 may extend continuously around the circumference of the ring seal 110. When the ring seal 110 is compressed, the axially outboard protrusion 162 may bear against a radial flange 124 to form, in some instances, a fifth circumferentially continuous seal at the contiguous interface therebetween. Also, the axially outboard protrusion 162 and the axially inboard protrusion 164 may individually and together resist both pressure and vacuum conditions in an associated fuel tank, and thus may save the ring seal 110 from pressure burst or blow-out and twisting or rolling.

Third Example Embodiment of the Ring Seal

Figure 6:
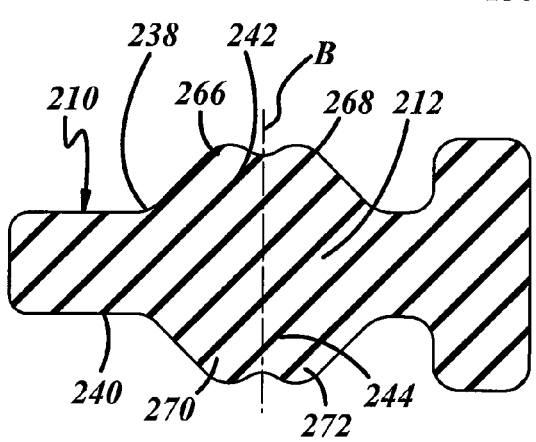
FIG. 6 is a cross-sectional view of a third example embodiment of a ring seal in an uncompressed state.

FIG. 6 shows a third example embodiment of a ring seal 210. This example embodiment is similar to the second example embodiment in some respects which may be gathered from the figure, and previous descriptions of which are incorporated by reference; additionally, like numerals between the example embodiments generally designate like or corresponding elements throughout the figures.

One difference in this example embodiment is a first sealing lobe 242 and a second sealing lobe 244. An axially outboard surface 238 defines in cross-section the first sealing lobe 242 being a roundish projection, and further defines in cross-section a first bead 266 and a second bead 268. Likewise, an axially inboard surface 240 defines in cross-section the second sealing lobe 244 being a roundish projection, and further defines in cross-section a third bead 270 and a fourth bead 272. Each bead may be a smaller roundish projection as compared to the sealing lobes, and may be more pronounced than shown while still defining the general sealing lobe profile. The beads 266, 268, 270, and 272 may extend continuously around the circumference of the ring seal 210. With respect to each other, the first bead 266 and the third bead 270 may be located at the same radial position relative to a body portion 212; and the second bead 268 and the fourth bead 272 may be likewise located at the same radial position relative to the body portion. Put differently, the first and second sealing lobes 242, 244 share a common imaginary axial centerline B such that the sealing lobes are generally symmetrical about the axial centerline.

When the ring seal 210 is compressed, the first bead 266 bears against an associated radial flange (not shown) to form a first circumferentially continuous seal at the contiguous interface therebetween, while the second bead 268 also bears against the radial flange to form a second circumferentially continuous seal thereat. Further, the third bead 270 bears against an upper surface of an associated lip (not shown) to form a third circumferentially continuous seal at the contiguous interface therebetween, while the fourth bead 272 also bears against the upper surface of the lip to form a fourth circumferentially continuous seal thereat. By virtue of their relation to each other, the first and second sealing lobes 242, 244 with the beads 266, 268, 270, and 272 help distribute a uniform compression load to the body portion 212. This improves sealing performance may save the ring seal 210 from pressure burst or blow-out and twisting or rolling.

Fourth Example Embodiment of the Ring Seal

Figure 7:
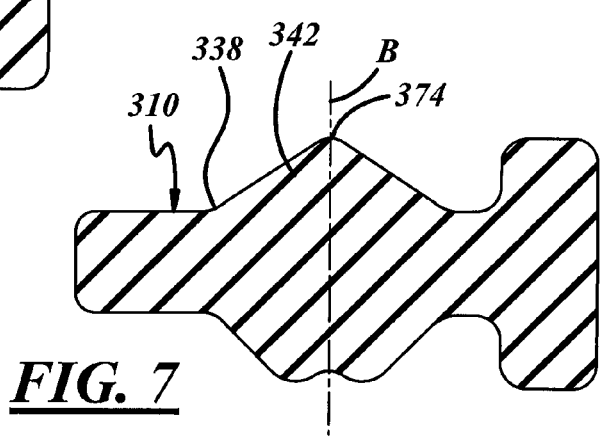
FIG. 7 is a cross-sectional view of a fourth example embodiment of a ring seal in an uncompressed state.

FIG. 7 shows a fourth example embodiment of a ring seal 310. This example embodiment is similar to the third example embodiment in some respects which may be gathered from the figure, and previous descriptions of which are incorporated by reference; additionally, like numerals between the example embodiments generally designate like or corresponding elements throughout the figures.

One difference in this example embodiment is a first sealing lobe 342. An axially outboard surface 338 defines in cross-section the first sealing lobe 342 being a roundish projection, and further defines an apex 374. The apex 374 may be pointed in a more pronounced manner than the previously described more roundish sealing lobes. The apex 374 may extend continuously around the circumference of the ring seal 310, and may be peaked at an imaginary axial centerline B such that the apex is generally symmetrical about the axial centerline. When the ring seal 310 is compressed, the apex 374 may bear against an associated radial flange (not shown) to form a first seal at the contiguous interface therebetween. And as in previous example embodiments, the apex 374 may help distribute a uniform compression load to the ring seal 310 which improves sealing performance and may save the ring seal from pressure burst or blow-out and twisting or rolling.

Although shown and described in particular example embodiments, subject matter in each may be used with others. For example, the ring seal of the first example embodiment including the skirt may also include the beads of the third example embodiment. And indeed, similar example embodiments may exist that are neither shown nor described but still may come within the scope of this described ring seal.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A ring seal comprising:
    a body portion which is annular, circumferentially continuous, has an axial axis and an exterior surface of the body portion and in an uncompressed state, has a circumferentially continuous first sealing lobe projecting axially outwardly from said exterior surface of the body, and a circumferentially continuous second sealing lobe axially spaced from and opposed to the first sealing lobe and projecting axially outwardly from said exterior surface of the body, the second sealing lobe shares an axial centerline with the first sealing lobe which axial centerline is parallel to said axial axis of said body portion, and the first and second sealing lobes project axially outwardly relative to each other; and
    a circumferentially continuous tail portion disposed radially inwardly of the sealing lobes and projecting axially outwardly from the body.

2. The ring seal of claim 1 wherein the body portion further comprises a radially outward projection extending radially outward of the sealing lobes that helps maintain a radial position of the ring seal with respect to a fuel system component when the ring seal is used with the fuel system component.

3. The ring seal of claim 1 wherein the first sealing lobe has a circumferentially continuous first sealing bead and a circumferentially continuous second sealing bead that are symmetrical about the axial centerline, and wherein the second sealing lobe has a circumferentially continuous third sealing bead and a circumferentially continuous fourth sealing bead that are symmetrical about the axial centerline.

4. The ring seal of claim 1 wherein the second sealing lobe has a first sealing bead and a second sealing bead that are symmetrical about the axial centerline.

5. The ring seal of claim 1 wherein the tail portion comprises a circumferentially continuous skirt disposed radially inward of the sealing lobes and in cross-section and in said uncompressed state, extending axially away from the body portion to a free end, the skirt helping to maintain a position of the ring seal with respect to a fuel system component when the ring seal is used with the fuel system component.

6. The ring seal of claim 5 wherein the skirt, in said cross-section and in said uncompressed state, has a radially inward surface defining a planar wall that, when the ring seal is assembled to a plug, bears generally flush against the plug to help maintain the position of the ring seal with respect to the fuel system component.

7. The ring seal of claim 6 wherein the skirt, in said cross-section and in said uncompressed state, has a radially outward surface defining a pilot wall inclined to the planar wall that helps center the position of the ring seal with respect to the fuel system component when assembling the plug and the ring seal to the fuel system component.

8. The ring seal of claim 7 wherein the radially outward surface defines a plurality of pilot protrusions that i) extend radially outward farther than the pilot wall, ii) are circumferentially disposed around the skirt, and iii) help center the position of the ring seal with respect to the fuel system component when assembling the plug and the ring seal to the fuel system component.

9. The ring seal of claim 1 wherein the tail portion, in cross-section and in said uncompressed state, extends axially relative to the body portion and has axially spaced-apart and opposed free ends, and comprises an axially outboard protrusion at one free end and an axially inboard protrusion at another free end, that individually and together help maintain a position of the ring seal with respect to a fuel system component when the ring seal is used with the fuel system component.

10. The ring seal of claim 9 wherein the tail portion, in cross-section and in said uncompressed state, has a radially inward surface defining a planar wall that extends between the axially outboard protrusion and the axially inboard protrusion, and that, when the ring seal is assembled to a plug, bears generally flush against the plug to help maintain the position of the ring seal with respect to the fuel system component.

11. A sealed joint comprising:
    a first component;
    a second component mounted to the first component; and
    the ring seal of claim 1, disposed between and sealingly contacting the first and second components.

12. An assembly comprising:
    a fuel tank defining an opening;
    a plug mounted to the fuel tank in the opening, the plug having an axial axis, a radial flange extending radially beyond a circumference of the opening and an axial flange extending axially into the opening; and
    a ring seal disposed between the fuel tank and the plug to form a sealed joint thereat, the ring seal comprising:
    a body portion which is annular, circumferentially continuous, in cross-section and in an uncompressed state has an axially outboard exterior surface defining a first sealing lobe to bear against the radial flange, and having an axially inboard exterior surface defining a second sealing lobe to bear against the fuel tank, wherein the first sealing lobe and the second sealing lobe are axially opposed, axially spaced apart, and share an axial centerline parallel to said axial axis, and the first and second sealing lobes project axially outwardly relative to each other; and a circumferentially continuous tail portion disposed radially inwardly of the sealing lobes and projecting axially outwardly from the body portion and having a radially inward surface defining a planar wall to bear generally flush against the axial flange to help maintain a position of the ring seal with respect to the fuel tank and the plug.

13. The assembly of claim 12 wherein the body portion has, in said cross-section and in said uncompressed state, a projection extending radially outward of the sealing lobes that helps maintain a radial position of the ring seal with respect to the fuel tank and the plug.

14. The assembly of claim 12 wherein the first sealing lobe has a first sealing bead and a second sealing bead that are symmetrical about the axial centerline, and wherein the second sealing lobe has a third sealing bead and a fourth sealing bead that are symmetrical about the axial centerline.

15. The assembly of claim 12 wherein the second sealing lobe has a first sealing bead and a second sealing bead that are symmetrical about the axial centerline.

16. The assembly of claim 12 wherein the tail portion comprises a circumferentially continuous skirt disposed radially inward of the sealing lobes and in said cross-section and in said uncompressed state, extending axially away from the body portion to a free end, the skirt helping to maintain the position of the ring seal with respect to the fuel tank and the plug.

17. The assembly of claim 16 wherein the skirt has, in said cross-section and in said uncompressed state, a radially outward surface defining a pilot wall inclined to the planar wall that helps center the position of the ring seal with respect to the opening of the fuel tank when the plug and the ring seal are mounted in the opening.

18. The assembly of claim 17 wherein the radially outward surface defines a plurality of pilot protrusions that i) extend radially outward farther than the pilot wall, ii) are circumferentially disposed around the skirt, and iii) help center the position of the ring seal with respect to the opening of the fuel tank when the plug and the ring seal are mounted in the opening.

19. The assembly of claim 12 wherein the tail portion, in said cross-section and in said uncompressed state, extends axially relative to the body portion and has axially spaced-apart and opposed free ends and comprises, an axially outboard protrusion at one free end and an opposed axially inboard protrusion at another free end opposed to the one free end, the planar wall extending between the outboard and the inboard protrusions, wherein the outboard and the inboard protrusions individually and together help maintain the position of the ring seal with respect to the fuel tank and the plug.

* * * * *